(12) United States Patent
Kang

(10) Patent No.: US 9,791,981 B2
(45) Date of Patent: Oct. 17, 2017

(54) TOUCH WINDOW AND TOUCH DEVICE INCLUDING THE SAME

(71) Applicant: LG INNOTEK CO., LTD., Seoul (KR)

(72) Inventor: Mun Suk Kang, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 14/479,479

(22) Filed: Sep. 8, 2014

(65) Prior Publication Data

US 2015/0070309 A1 Mar. 12, 2015

(30) Foreign Application Priority Data

Sep. 6, 2013 (KR) .................. 10-2013-0107066

(51) Int. Cl.
G06F 3/045 (2006.01)
G06F 3/044 (2006.01)

(52) U.S. Cl.
CPC .... G06F 3/044 (2013.01); *G06F 2203/04102* (2013.01); *G06F 2203/04103* (2013.01); *G06F 2203/04112* (2013.01)

(58) Field of Classification Search
CPC .......... G06F 3/044; G06F 3/041; G06F 3/045; G06F 3/042; G06K 11/06; G08C 21/00
USPC ..................... 345/168–174; 178/18.01–18.06
See application file for complete search history.

(56) References Cited

U.S. PATENT DOCUMENTS

| | | |
|---|---|---|
| 2002/0149572 A1 | 10/2002 | Schulz et al. |
| 2010/0245285 A1 | 9/2010 | Wang et al. |
| 2011/0273394 A1* | 11/2011 | Young ................. G06F 3/047 345/174 |
| 2012/0032888 A1* | 2/2012 | Moller ................. G06F 3/0202 345/169 |
| 2012/0075209 A1 | 3/2012 | Lee et al. |
| 2012/0249465 A1* | 10/2012 | Lin ....................... G06F 3/041 345/173 |
| 2013/0002133 A1 | 1/2013 | Jin et al. |
| 2013/0002583 A1* | 1/2013 | Jin ........................ G06F 1/1637 345/173 |
| 2013/0022811 A1 | 1/2013 | Ahn et al. |

(Continued)

FOREIGN PATENT DOCUMENTS

| | | |
|---|---|---|
| KR | 10-2011-0027297 A | 3/2011 |
| KR | 10-2013-0000786 A | 1/2013 |
| WO | WO 2012/015284 A2 | 2/2012 |

OTHER PUBLICATIONS

European Search Report issued in Application No. 14182756.8 dated Mar. 13, 2015.

(Continued)

*Primary Examiner* — Pegeman Karimi
(74) *Attorney, Agent, or Firm* — KED & Associates, LLP

(57) ABSTRACT

A touch window may include a substrate, a sensing electrode disposed on the substrate to sense a position, and a protective layer on the sensing electrode. A touch device may include the touch window, and a driving part on the touch window. The substrate may include a first active area and a second active area. The second active area may be flexibly provided from the first active area. The sensing electrode may be provided on the substrate to sense a position. Moreover, the protective layer may be disposed in the second active area.

23 Claims, 14 Drawing Sheets

(56) References Cited

U.S. PATENT DOCUMENTS

| | | | |
|---|---|---|---|
| 2013/0127771 A1 | 5/2013 | Carley et al. | |
| 2013/0155011 A1* | 6/2013 | Kim | G06F 3/044 |
| | | | 345/174 |
| 2013/0181925 A1 | 7/2013 | Kim et al. | |
| 2013/0194220 A1* | 8/2013 | Lee | G06F 3/041 |
| | | | 345/173 |
| 2013/0342429 A1* | 12/2013 | Choi | H05K 13/00 |
| | | | 345/30 |
| 2014/0055702 A1* | 2/2014 | Park | G02F 1/136286 |
| | | | 349/43 |
| 2014/0102298 A1* | 4/2014 | Hasse | F25J 3/067 |
| | | | 95/51 |
| 2014/0145977 A1* | 5/2014 | Kang | G06F 3/044 |
| | | | 345/173 |
| 2014/0152609 A1* | 6/2014 | Kim | G06F 3/0418 |
| | | | 345/174 |
| 2015/0091012 A1* | 4/2015 | Namkung | G09G 3/34 |
| | | | 257/72 |

OTHER PUBLICATIONS

European Communication pursuant to Article 94(3) EPC dated Jun. 20, 2017 issued in Application No. 14182756.8.

* cited by examiner

TOUCH WINDOW AND TOUCH DEVICE INCLUDING THE SAME

CROSS-REFERENCE TO RELATED APPLICATION

This application claims priority under 35 U.S.C. §119 to Korean Application No. 10-2013-0107066 filed on Sep. 6, 2013, whose entire disclosure is hereby incorporated by reference.

BACKGROUND

1. Field

The disclosure relates to a touch window and a touch device including the same.

2. Background

A touch panel, which performs an input function through the touch of an image displayed on a touch device by an input device such as a stylus pen or a hand, has been applied to various electronic appliances. The touch panel may be typically classified into a resistive touch panel and a capacitive touch panel. In the resistive touch panel, the position of the touch point is detected by detecting the variation of resistance according to the connection between electrodes when pressure is applied to an input device. In the capacitive touch panel, the position of the touch point is detected by detecting the variation in capacitance when a finger of the user is touched on the capacitive touch panel between electrodes. When taking into consideration the convenience of a fabrication scheme and a sensing power, the capacitive touch panel has been spotlighted in a smaller model touch panel recently.

The demand for a flexible touch panel has increased because if the touch panel is flexible or bendable, it increases a user experience. However, indium tin oxide (ITO), which is widely used material for the transparent electrode of the touch panel, is easily damaged when the substrate is flexed and bent, so that the electrode property is deteriorated. Therefore, the indium tin oxide (ITO) is not suitable for a flexible device. Meanwhile, when a flexible material instead of ITO is used for the transparent electrode, the visibility of the flexible material is poorer than that of ITO due to light reflection.

BRIEF DESCRIPTION OF THE DRAWINGS

The embodiments will be described in detail with reference to the following drawings in which like reference numerals refer to like elements wherein.

DETAILED DESCRIPTION

In the following description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

Figure 1:
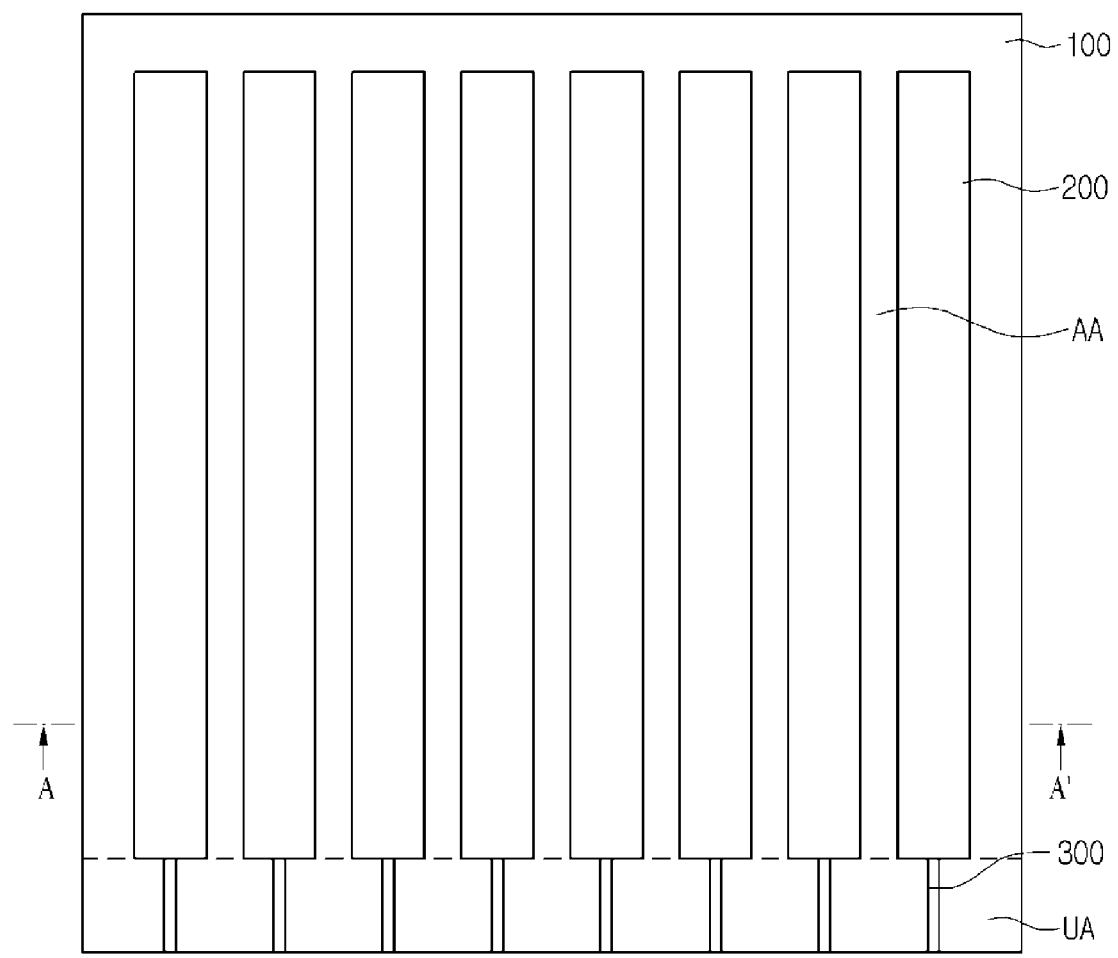
FIG. 1 is a plan view showing a touch window according to an embodiment.
Figure 2:
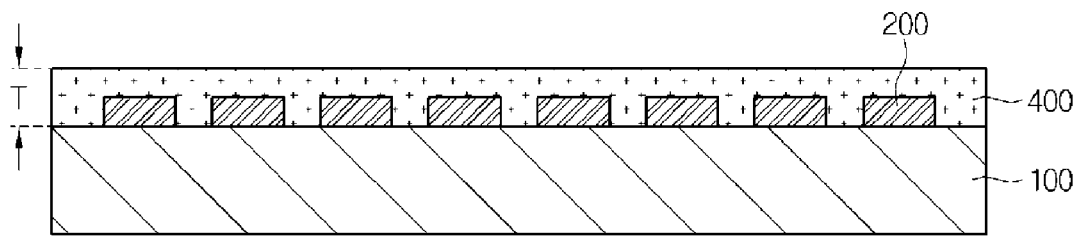
FIGS. 2 and 3 are sectional views taken along line A-A' of FIG. 1.
Figure 3:
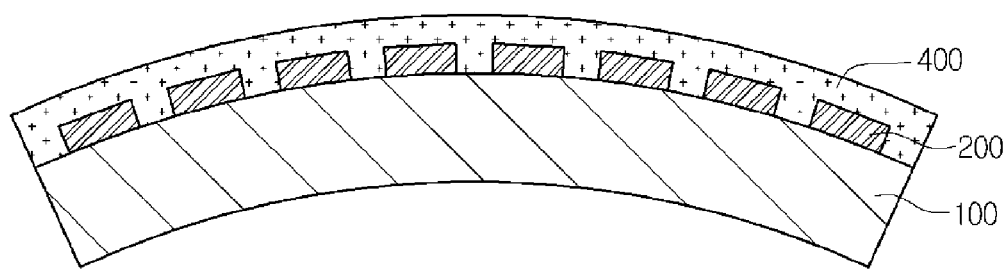

FIGS. 1 to 3. FIG. are plan views showing a touch window according to an embodiment. FIGS. 2 and 3 are sectional views taken along line A-A' of FIG. 1. A touch window according to the embodiment includes a substrate 100 having an active area AA, in which a position of an input from a finger or an input device is detected, and an unactive or inactive area UA provided at a peripheral portion of the active area AA.

In this case, a sensing electrode 200 may be formed in the active area AA such that the input device may be sensed. Wires 300 electrically connecting the sensing electrodes 200 to each other may be formed in the unactive area UA. In addition, an external circuit connected to the wires 300 may be placed in the unactive area UA.

When an input is provided onto a touch window, the difference in capacitance is made on a touched portion by the finger or the input device, and the touched portion representing the difference in capacitance may be detected as a touch point.

Such a touch window will be described in more detail as follows.

The substrate 100 may be formed of various materials capable of supporting the sensing electrode 200, the wire 300 and a circuit substrate which are formed on the substrate 100. The substrate 100 may include a glass substrate, a plastic substrate including polyethylene terephthalate (PET) film, or a sapphire substrate.

The sapphire has superior electric characteristics, such as permittivity, so that a touch response speed may be greatly increased and a space touch such as hovering may be easily implemented. In addition since the sapphire has a high surface hardness, the sapphire is applicable to a cover substrate. The hovering signifies a technique for recognizing a coordinate even in a position spaced apart from a display by a short distance. Further, the substrate 100 may be bent to have a partial curved surface. That is, the substrate 100 may be bent to have a partial flat surface and a partial curved surface. In detail, an end of the substrate 100 may be bent to have a curved surface or may be bent or flexed to have a surface including a random curvature.

The outer dummy layer is formed in the unactive area UA of the substrate 100. The outer dummy layer may be coated with a material having a predetermined color so that the wires 300 and a printed circuit board connecting the wires 300 to external circuits cannot be viewed from the outside. The outer dummy layer may have a color suitable for a desired outer appearance thereof. For example, the outer dummy layer includes black pigments to represent black. In addition, a desired logo may be formed in the outer dummy layer through various schemes. The outer dummy layer may be formed through deposition, print, and wet coating schemes.

The sensing electrode 200 may be formed on the substrate 100. The sensing electrode 200 may detect whether the input by a finger or an input device is touched thereto or not. FIG. 1 shows the sensing electrode 200 extending on the substrate 100 in one direction, but the embodiment is not limited thereto. Accordingly, the sensing electrode 200 may extend in another direction crossing the one direction. In addition, the sensing electrode 200 may include two types of sensing electrodes having shapes extending in the directions.

The sensing electrode 200 may include a transparent conductive material. For example, the sensing electrode 200 may include metal oxide such as indium tin oxide, indium zinc oxide, copper oxide, tin oxide, zinc oxide or titanium oxide. The materials are very useful for visibility without interrupting transmission of light.

A protective layer 400 is provided on the sensing electrode 200. The protective layer 400 may make direct contact with the sensing electrode 200. That is, the protective layer 400 may make direct contact with a top surface of the sensing electrode 200. The protective layer 400 may protect the sensing electrode 200. In detail, as shown in FIG. 3, when the substrate is bent or flexed, the protective layer 400 may protect the sensing electrode 200 from a physical shock. That is, the protective layer 400 may reinforce the sensing electrode 200 so that the reliability may be improved.

In addition, the protective layer 400 is index-matched with the sensing electrode 200 by adjusting the refractive index, so that the optical property and visibility may be improved. The protective layer 400 may include various polymer materials. The protective layer 400 may include polyurethane, acrylate, methacrylate, epoxy, polycarbonate, polyethylene or polystyrene.

The protective layer 400 may have a thickness T in the range of 1 μm to 20 μm. When the thickness T of the protective layer 400 is 1 μm or more, the sensing electrode 200 may be physically reinforced. When the thickness T of the protective layer 400 is 20 μm or less, the thickness of the touch window may be prevented from being increased. The thickness of the protective layer 400 may be in the range of 2 μm to 15 μm, and specifically, the thickness of the protective layer 400 may be in the range of 4 μm to 10 μm.

The wire 300 is formed in the unactive area UA. An electrical signal may be applied to the sensing electrode 200 through the wire 300. The wire 300 is formed in the unactive area UA, so that the wire 300 may not be seen. Although not shown in the drawings, a circuit substrate connected to the wire 300 may be further provided. Various types of printed circuit boards may be applied as the circuit substrate. For example, a flexible printed circuit board (FPCB) may be applied as the circuit substrate.

A touch window according to another embodiment will be described with reference to FIGS. 4 to 13. In the following description about the touch window according to another embodiment, the parts similar or identical to those of the previously described embodiment will be omitted for the purpose of clear and brief description.

Figure 4:
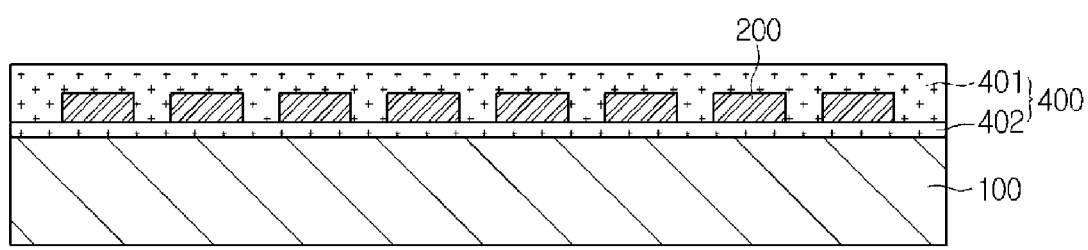
FIG. 4 is a sectional view showing a touch window according to another embodiment.

Referring to FIG. 4, the protective layer 400 includes a first protective layer 401 and a second protective layer 402. The first protective layer 401 is provided on a top surface of the sensing electrode 200. The second protective layer 402 is provided on a bottom surface of the sensing electrode 200. That is, the top and bottom surfaces of the sensing electrode 200 may be protected through the first and second protective layers 401 and 402. Thus, the strength enhancement of the sensing electrode 200 may be maximized.

Figure 5:
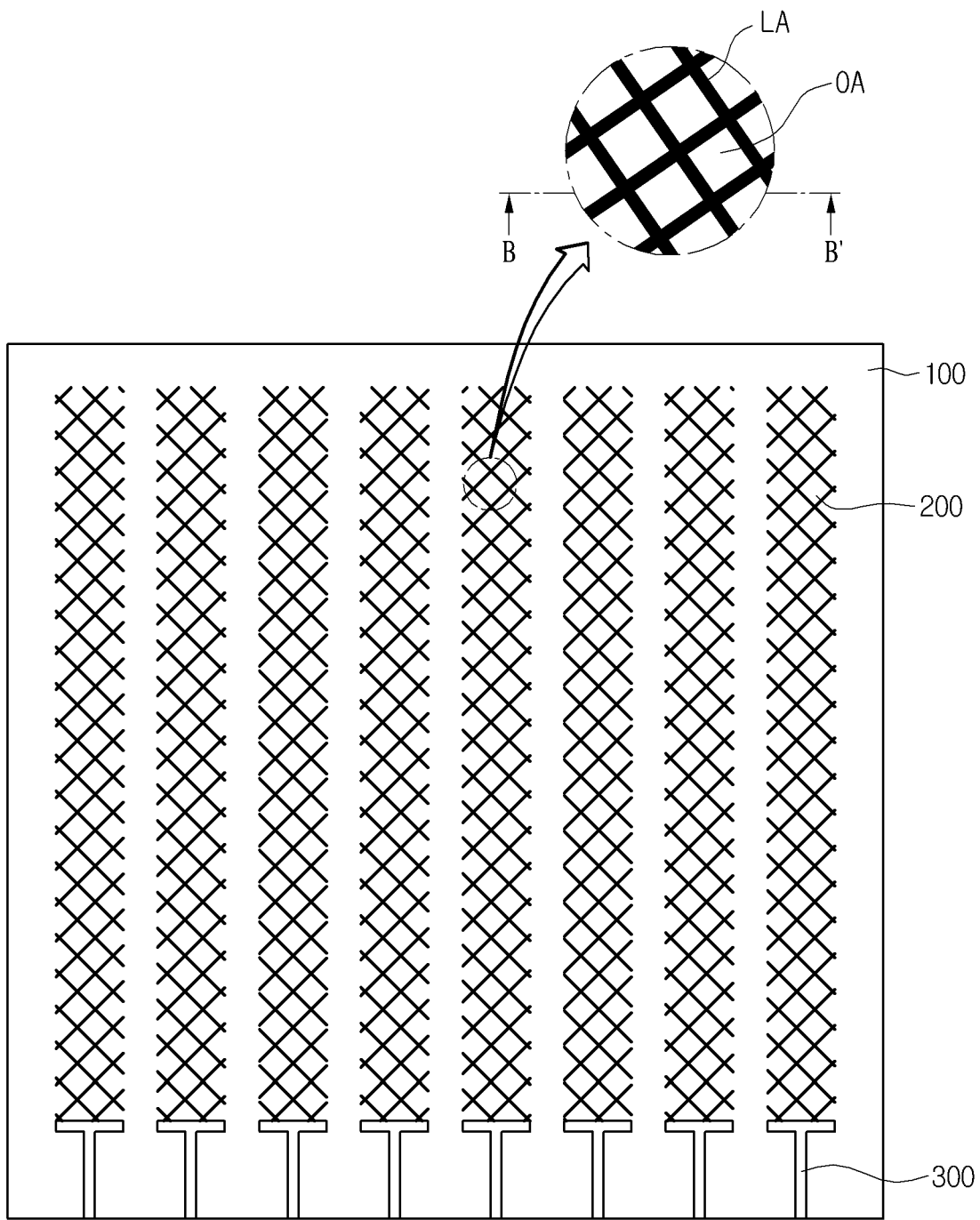
FIG. 5 is a plan view showing a touch window according to another embodiment.
Figure 6:
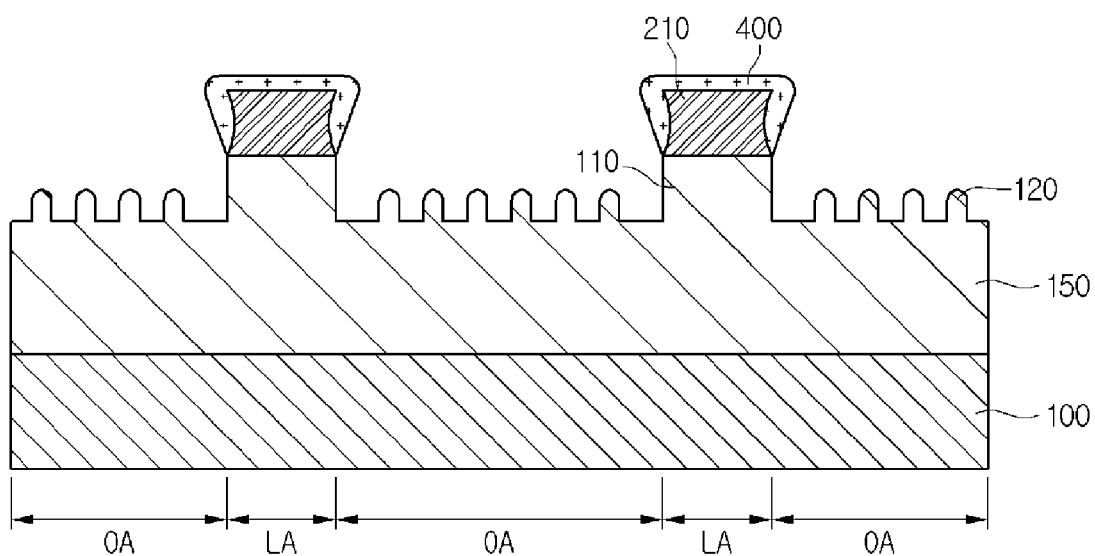
FIG. 6 is a sectional view taken along line B-B' of FIG. 5.

Referring to FIGS. 5 and 6, the sensing electrode 200 may include a conductive pattern. For example, the sensing electrode 200 is arranged in a mesh shape or mesh pattern. In detail, the sensing electrode 200 may include a mesh opening OA and a mesh line LA. In this case, a line width of the mesh line LA may be in the range of 0.1 μm to 10 μm. A mesh line LA of 0.1 μm or less may not be formed due to the characteristics of the manufacturing process. If the line width is 10 μm or less, the pattern of the sensing electrode 200 may not be viewed. The line width of the mesh line LA may be in the range of 0.5 μm to 7 μm, and specifically, the line width of the mesh line LA may be in the range of 1 μm to 3.5 μm.

As shown in FIG. 5, the mesh opening OA may have a rectangular shape, but the embodiment is not limited thereto. The mesh opening OA may have various shapes such as a polygonal shape including a diamond shape, a pentagonal shape or a hexagonal shape, or a circular shape. In addition, the mesh opening OA may be formed in a regular or random shape.

As the sensing electrode 200 has a mesh shape or mesh pattern, the pattern of the sensing electrode 200 may not be viewed in the active area AA. In other words, even when the sensing electrode 200 is formed of metal, the pattern may not be viewed or seen. In addition, even when the sensing electrode 200 is applied to a large-size touch window, the resistance of the touch window may be reduced.

Referring to FIG. 6, the sensing electrode 200 may include a first sub-pattern 110, a second sub-pattern 120 and an electrode layer 210. The first sub-pattern 110 is disposed on a resin layer 150. The first sub-pattern 110 is disposed on the mesh line LA. Thus, the first sub-pattern 110 is disposed in a mesh shape. The first sub-pattern 110 may be embossed.

Meanwhile, the sub-pattern 120 is disposed to be adjacent to the first sub-pattern 120. The second sub-pattern 120 is disposed on the resin layer 150. The second sub-pattern 120 is disposed in the mesh opening OA. Thus, the second sub-pattern 120 may be interposed between the first sub-patterns 110. The second sub-pattern 120 may be embossed.

The first and second sub-patterns 110 and 120 may include resin or polymer. The first and second sub-patterns 110 and 120 may include resin or polymer. The first and second sub-patterns 110 and 120 may be formed through an imprinting process. That is, the first and second sub-patterns 110 and 120 may be formed on the resin layer 150 through a mold on which a desired pattern is formed.

The electrode layer 210 is disposed on the first sub-pattern 110. Thus, the electrode layer 210 is disposed on the mesh line LA in the mesh shape. The sensing electrode 200 may include a metallic material having excellent electric conductivity. For example, the sensing electrode 200 may include at least one of Cu, Au, Ag, Al, Ti, Ni and the alloy thereof. Thus, electrical characteristics of the touch window to which the sensing electrode 200 is applied may be improved.

The protective layer 400 may be disposed on the electrode layer 210. The protective layer 400 may be disposed to surround the top and side surfaces of the electrode layer 210. As shown in FIG. 6, the protective layer 400 may be provided only on the electrode layer 210. Thus, the protective layer 400 may be disposed in the mesh shape.

Figure 7:
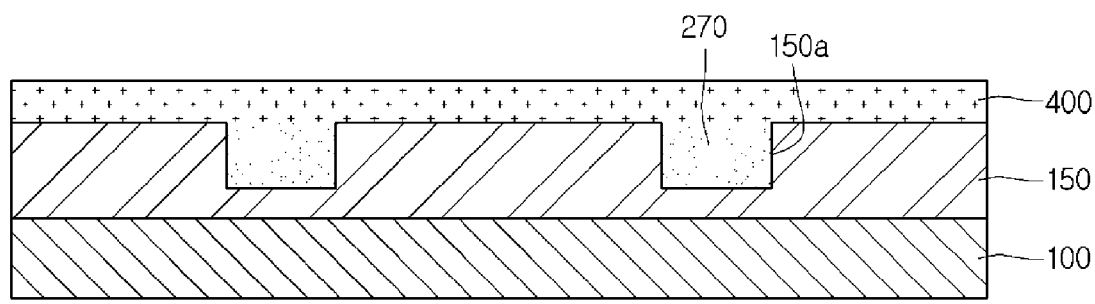
FIGS. 7 to 10 are sectional views showing a touch window according to another embodiment.

Referring to FIG. 7, the resin layer 150 may be disposed on the substrate 100 and the resin layer 150 may include an intaglio portion 150a. In this case, the electrode layer 210 may be disposed in the intaglio portions 150a. That is, the sensing electrode 200 may be formed by filling the intaglio portions 150a with an electrode material 270. Therefore, the number, time and cost of processes may be reduced as compared with the deposition and photograph processes according to the related art.

Figure 8:
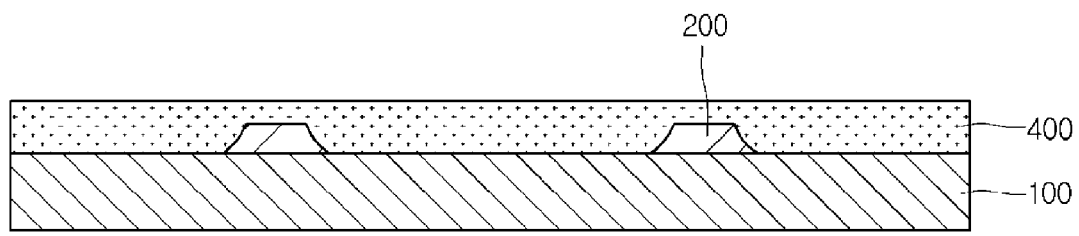

Referring to FIG. 8, the sensing electrode 200 having a conductive pattern may be formed by etching the metallic material on the substrate 100. For example, after copper (Cu) is deposited on the substrate, metal etching may be performed to form the sensing electrode 200.

Figure 9:
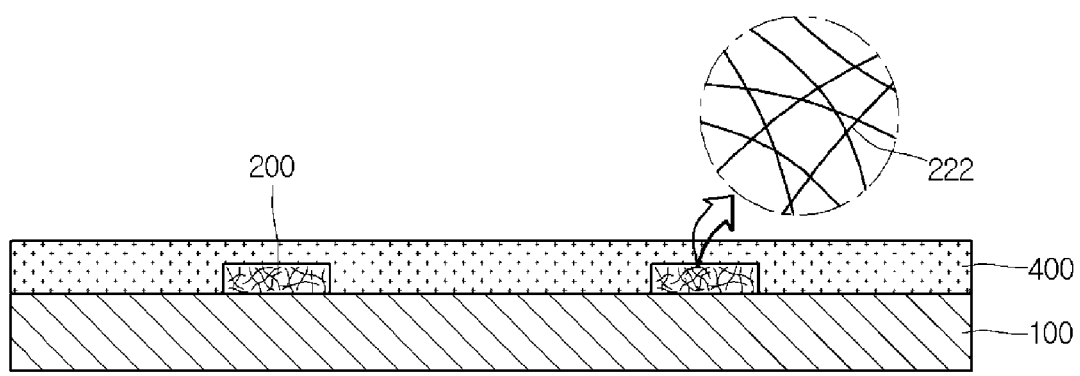

Referring to FIG. 9, the sensing electrode 200 may include an interconnecting structure 222. The interconnecting structure 222 may include a fine structure having a diameter in the range of 10 nm to 200 nm. For example, the sensing electrode 200 may include a nanowire. The sensing electrode 200 may include a metal nanowire.

Figure 10:
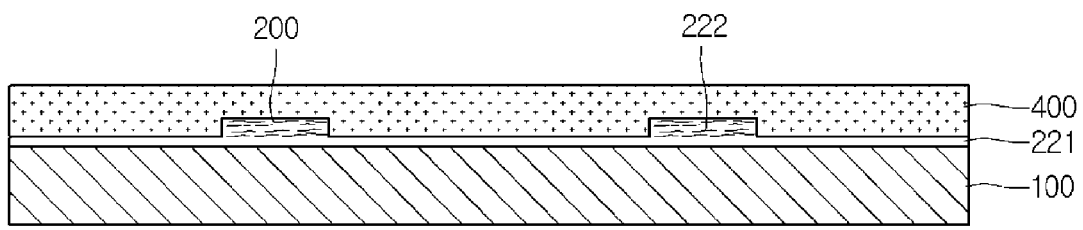
Figure 11:
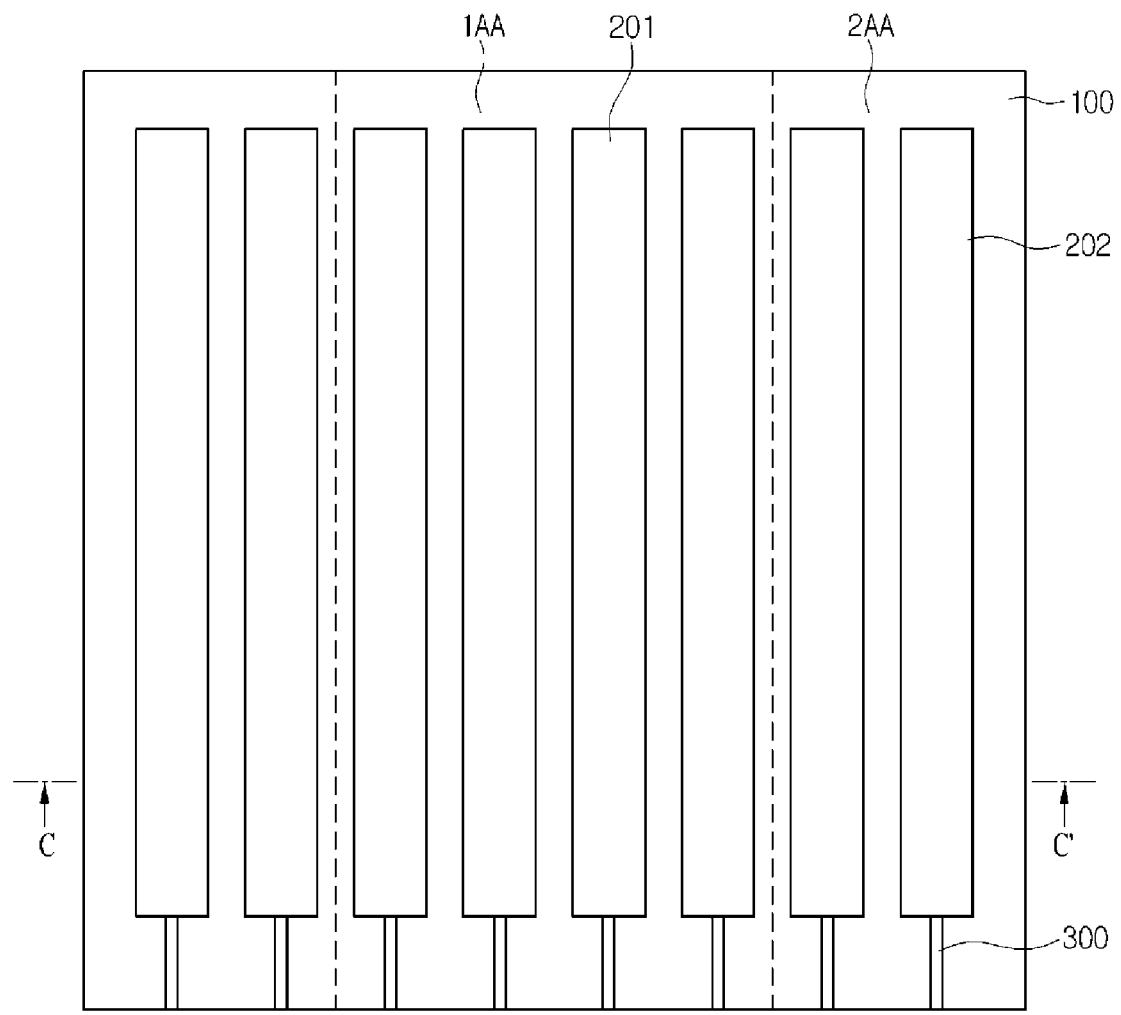
FIG. 11 is a plan view showing a touch window according to another embodiment.
Figure 12:
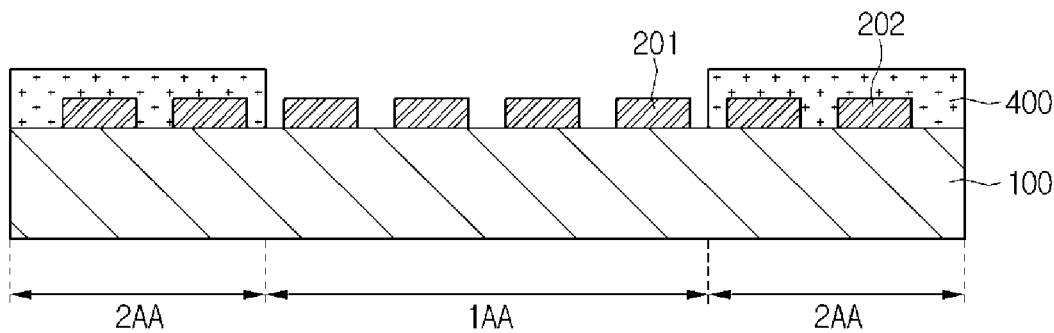
FIGS. 12 to 14 are sectional views taken along line C-C' of FIG. 11.

Referring to FIG. 10, the sensing electrode 200 may include a base material 221 and a nanowire. The base material 221 includes a photo sensitive material. Since the base material 221 include the photo sensitive material, the sensing electrode 200 may be formed through exposure and development processes.

The sensing electrode 200 may include a photo sensitive nanowire film. Since the sensitive electrode 200 includes the photo sensitive nanowire film, a thickness of the sensing electrode 200 may be thinned. That is, even though the sensing electrode 200 includes the nanowire, the entire thickness of the sensing electrode 200 may be thinned.

Meanwhile, although it is shown that the protective layer 400 is disposed on a front surface of the substrate 100, the embodiment is not limited thereto. Thus, the protective layer 400 may be disposed only on the sensing electrode 200.

Figure 13:
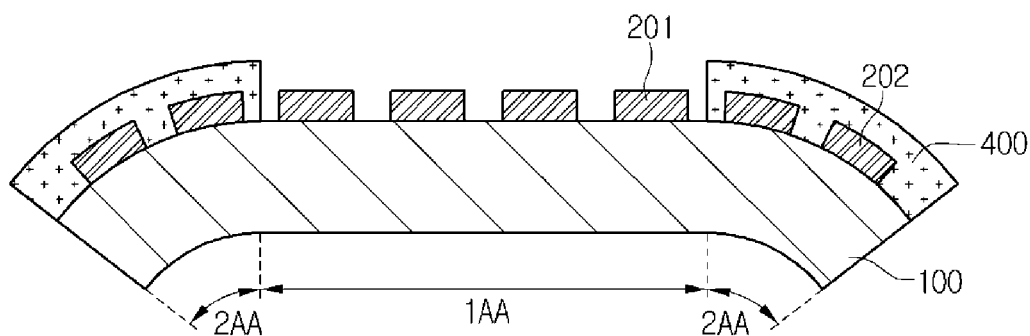
Figure 14:
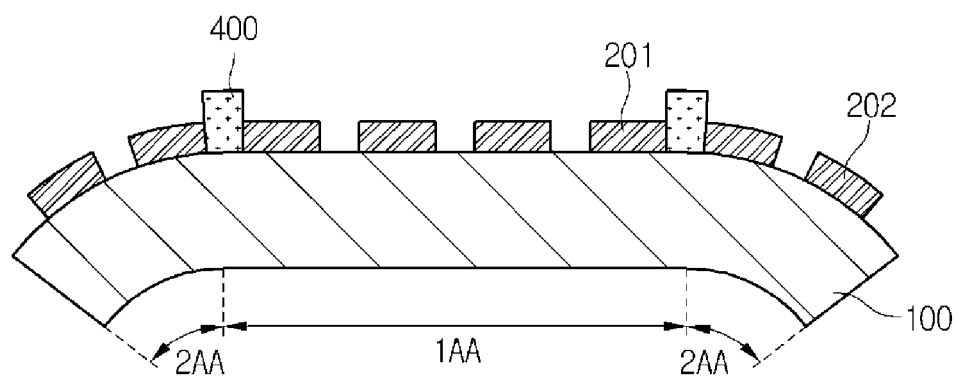

Referring to FIGS. 11 to 14, the substrate includes first and second active areas 1AA and 2AA. A first sensing electrode 201 may be disposed in the first active area 1AA. The second active area 2AA may be disposed at a side of the first active area 1AA. As shown in the drawings, the second active area 2AA may be disposed at both sides of the first active area 1AA. Referring to FIG. 13, the second active area 2AA may be bent from the first active area 1AA. That is, the second active area 2AA may be flexible.

The second active area 2AA, which is bent or flexed from the first active area 1AA, is fixed in state that the second active area 2AA is bent, so that the shape in the bent state may be maintained. In addition, when physical force is applied in the direction opposite to the bending direction in a state that the bent state is maintained, the second active area 2AA may be modified to be bent or flattened corresponding to the quantity and direction of the force applied thereto.

The first and second sensing electrode 201 and 202 may include mutually different materials. In detail, the first and second electrode 201 and 202 may include materials having mutually different properties.

For example, the first sensing electrode 201 may include a first material. The first material may include metal oxide such as indium tin oxide, indium zinc oxide, copper oxide, tin oxide, zinc oxide or titanium oxide. The first material is very useful for visibility without interrupting transmission of light. However, the first material may also be easily damaged physically due to bending and flexing of the substrate.

The second sensing electrode 202 may include a second material different from the first material. For example, the second material may include various metallic materials including a nanowire, a carbon nanotube (CNT), graphene or conductive polymer. In addition, the second sensing electrode 202 may include at least one of Cu, Au, Ag, Al, Ti, Ni and the alloy thereof. The second materials have a flexible property suitable for the flexing or bending of the substrate. Alternatively, the first sensing electrode 201 may include the second material and the second sensing electrode 202 may include the first material.

The protective layer 400 is disposed on the second sensing electrode 202, and the protective layer 400 is disposed in the second active area 2AA. The protective layer 400 may be only provided in the second active area 2AA which is bent, so that the second sensing electrode 202 may be bent without any physical damage.

In addition or alternatively, the protective layer 400 may be interposed between the first and second sensing electrode 201 and 202. The protective layer 400 is disposed in a boundary area between the first and second active areas 1AA and 2AA. In other words, since the protective layer 400 is disposed in the boundary area in which the protective layer 400 is bent from the first active area 1AA toward the second active area 2AA, the protective layer 400 may be bent without any physical damage when being bent.

A touch window which is partially bent may be implemented through the protective layer 400. Thus, the structural variety of a flexible touch window may be secured. In addition or alternatively, the protective layer 400 may be additionally disposed even in the first active area 1AA and of course, may be disposed on the front surface of the substrate 100.

Figure 15:
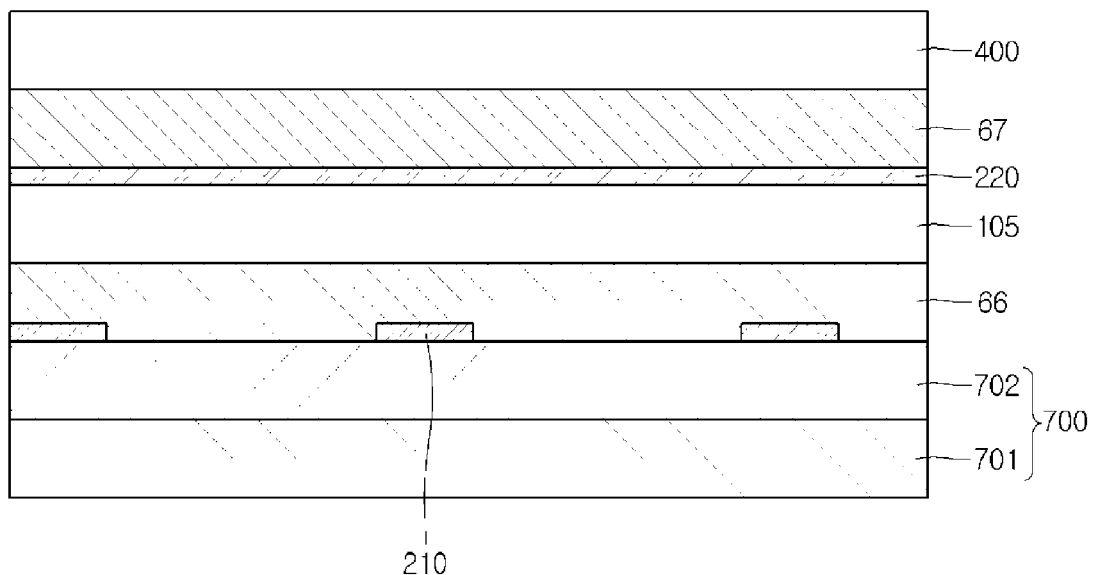
FIGS. 15 and 16 are views illustrating a touch device according to another embodiment.
Figure 16:
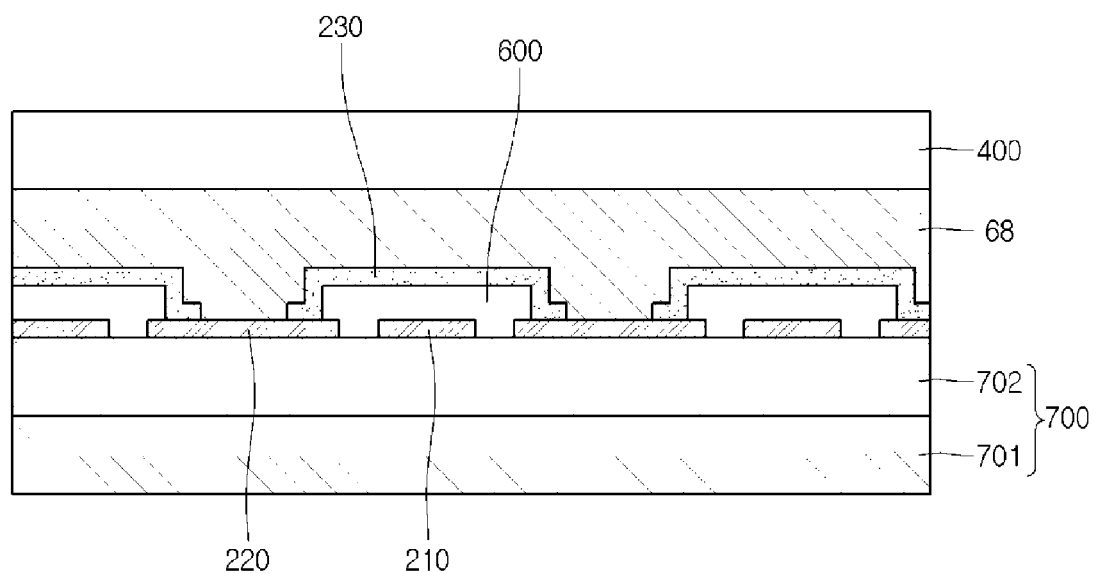

A touch device to which the touch window is applied according to another embodiment of the present invention will be described with reference to FIGS. 15 and 16. FIGS. 15 and 16 are views illustrating a touch device to which the touch window is applied according to another embodiment. The same description as that in the above-described embodiment will be omitted in order to avoid redundancy. The same reference numerals will be used to refer to the same elements.

Referring to FIGS. 15 and 16, a touch device according to another embodiment may include a touch window which is formed integrally with a touch panel 700. That is, a substrate supporting at least one sensing electrode may be omitted.

In detail, at least one sensing electrode may be formed on at least one surface of the display panel 700. The display panel 700 includes first and second substrates 701 and 702. That is, at least one sensing electrode may be formed on at least one surface of the first or second substrate 701 or 702.

When the display panel 700 is a liquid crystal display panel, the display panel 700 may be formed in a structure where the first substrate 701 including a thin film transistor (TFT) and a pixel electrode and the second substrate 702 including color filter layers are combined with each other while interposing a liquid crystal layer therebetween.

In addition, the display panel 700 may be a liquid crystal display panel having a COT (color filter on transistor) structure in which the second substrate 702 is combined with the first substrate 701 on which a thin film transistor, a color filter and a black matrix are formed while a liquid crystal layer is interposed between the first and second substrates 701 and 702. That is, the thin film transistor is formed on the first substrate 701, the protective layer is formed on the thin film transistor, and the color filter layer is formed on the protective layer. In addition, the pixel electrode making contact with the thin film transistor is formed on the first substrate 701. In this case, in order to improve an aperture rate and simplify a mask process, the black matrix may be omitted and a common electrode may be formed to serve as the black matrix.

In addition, when the display panel 700 is a liquid crystal panel, the display device may further include a backlight unit for providing light at the back of the display panel 700.

When the display panel 700 is an organic light emitting device, the display panel 700 includes a self light-emitting device which does not require any additional light source. A thin film transistor is formed on the first substrate 701 of the display panel 700, and an organic light-emitting device (OLED) making contact with the thin film transistor is formed. The OLED may include an anode, a cathode and an organic light-emitting layer formed between the anode and the cathode. In addition, the display panel 700 may further include the second substrate 702, which performs the function of an encapsulation substrate for encapsulation, on the OLED.

In this case, at least one sensing electrode may be formed on a top surface of the substrate disposed at an upper portion. Although a configuration of forming the sensing electrode on the top surface of the second substrate 702 is depicted in the drawings, if the sensing electrode is disposed on the first substrate 701, at least one sensing electrode may be formed on the top surface of the first substrate 701.

Referring to FIG. 15, the first sensing electrode 210 may be formed on the top surface of the display panel 700. In addition, the first wire connected to the first sensing electrode 210 may be formed. The touch substrate 105, on which the second sensing electrode 220 and the second wire are formed, may be formed on the display panel 700 on which the first sensing electrode 210. A first adhesive layer 66 may be formed between the touch substrate 105 and the display panel 700.

Although the second sensing electrode 220 formed on the top surface of the touch substrate 105 and the cover substrate 400 disposed on the touch substrate while a second adhesive layer 67 is interposed between the second sensing electrode 220 and the cover substrate 400 are depicted in the drawings, the embodiment is not limited thereto. The second sensing electrode 220 may be formed on a rear surface of the touch substrate 105. In this case, the touch substrate 105 may serve as the cover substrate.

That is, the embodiment is not limited to the drawings and is sufficient if the touch device has a structure in which the first sensing electrode 210 is formed on the top surface of the display panel 700, the touch substrate 105 supporting the second sensing electrode 220 is disposed on the display panel 700, and the touch substrate 105 is combined with the display panel 700.

In addition, the touch substrate 105 may be a polarizing plate. That is, the second electrode 220 may be formed on a top or rear surface of the polarizing plate. Thus, the second sensing electrode and the polarizing plate may be integrally formed.

In addition, a polarizing plate may be further provided without regard to the touch substrate 105. In this case, the polarizing plate may be disposed below the touch substrate 105. For example, the polarizing plate may be interposed between the touch substrate 105 and the display panel 700. In addition, the polarizing plate may be disposed on the touch substrate 105.

The polarizing plate may be a linear polarizing plate or an anti-reflection polarizing plate. For example, when the display panel 700 is a liquid crystal display panel, the polarizing plate may be a linear polarizing plate. In addition, when the display panel 700 is an organic electroluminescent display panel, the polarizing plate may be an anti-reflection polarizing plate.

Referring to FIG. 16, the first and second sensing electrodes 210 and 220 may be formed on the top surface of the display panel 700. In addition, the first wire connected to the first sensing electrode 210 and the second wire connected to the second sensing electrode 220 may be formed on the top surface of the display panel 700.

In addition, an insulating layer 600 exposing the second sensing electrode 220 may be formed on the first sensing electrode 210. A bridge electrode 230 for connecting the second sensing electrodes 220 to each other may be further formed on the insulating layer 600.

The embodiment is not limited just to the drawings. The first sensing electrode 210 and the first and second wires may be formed on the top surface of the display panel 700, and the insulating layer may be formed on the first sensing electrode 210 and the first wire. The second electrode 220 may be formed on the insulating layer, and a connecting part for connecting the second sensing electrode 220 and the second wire to each other may be further included.

In addition, the first and second sensing electrodes 210 and 220 and the first and second wires may be formed on the top surface of the display panel 700 in the active area. The first and second sensing electrodes 210 and 220 may be spaced apart from and adjacent to each other. That is, the insulating layer and the bridge electrode may be omitted.

That is, the embodiment is not limited to the drawings, and it is sufficient if the first and second sensing electrodes 210 and 220 are formed on the display panel 70 without any additional substrates supporting the sensing electrodes.

The cover substrate 400 may be disposed on the display panel 700 while an adhesive layer 68 is interposed between the cover substrate and the display panel 700. In this case, a polarizing plate may be disposed between the display panel 700 and the cover substrate 400.

Next, a touch device according to still another embodiment will be described with reference to FIGS. 17 to 20. FIGS. 17 to 20 are views illustrating a touch device to which a touch window is applied according to still another embodiment. The same description as that in the above-described embodiment will be omitted in order to avoid redundancy. The same reference numerals will be used to refer to the same elements.

Referring to FIGS. 17 to 20, a touch device according to still another embodiment may include a touch window formed integrally with a display panel. That is, a substrate supporting at least one sensing electrode may be omitted. All substrates supporting sensing electrodes may be omitted.

A sensing electrode, which serves as a sensor disposed in an active area to sense a touch, and a wire, to which an electrical signal is applied, may be formed inside the display panel. In detail, at least one sensing electrode or at least one wire may be formed inside the display panel.

The display panel includes first and second substrates 701 and 702. In this case, at least one of the first and second sensing electrodes 210 and 220 is disposed between the first and second substrates 701 and 702. That is, at least one sensing electrode may be formed on at least one surface of the first or second substrate 701 or 702.

Figure 17:
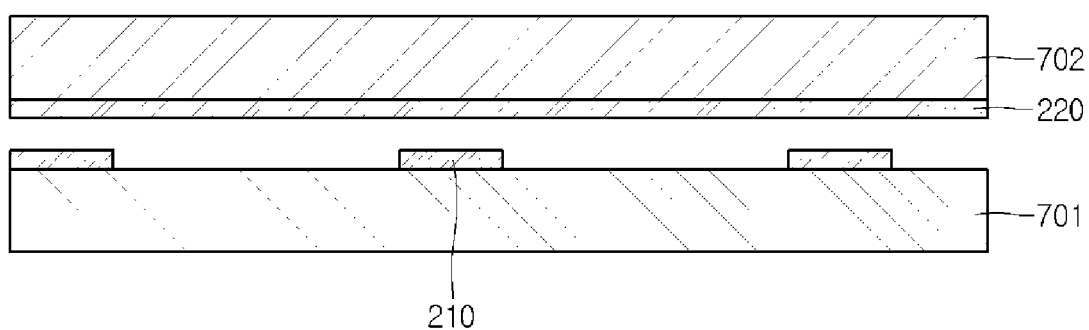
FIGS. 17 to 20 are views illustrating a touch device according to another embodiment.
Figure 20:
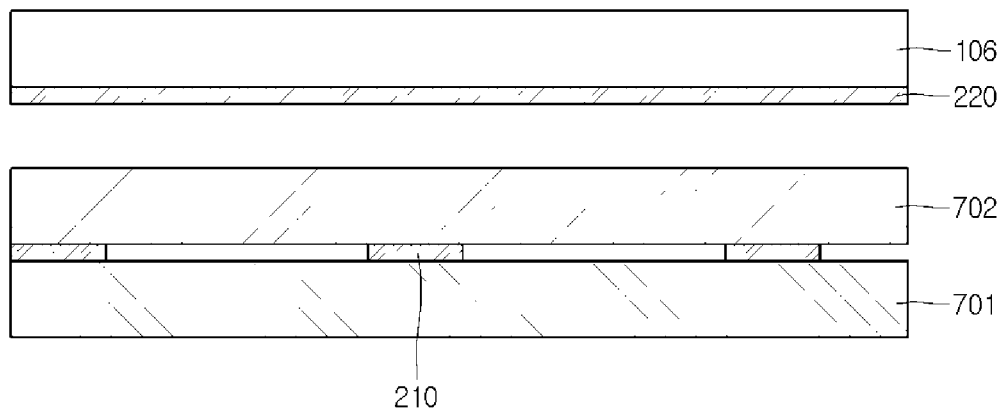
Figure 21:
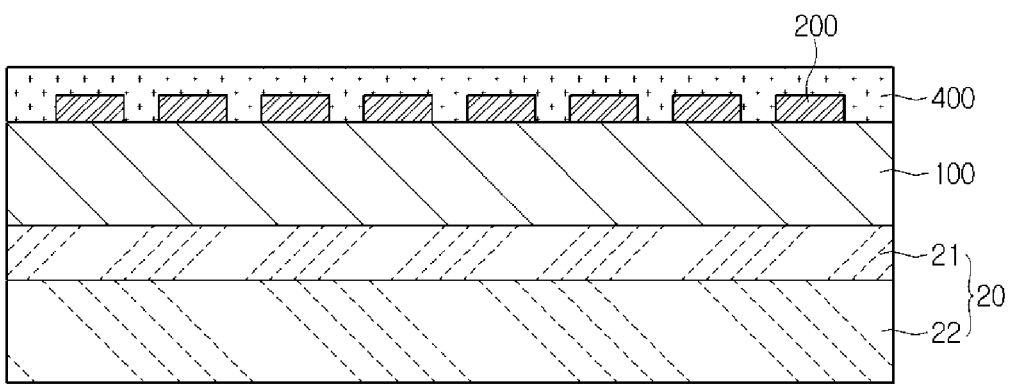
FIG. 21 is a sectional view showing a touch device in which a touch window is disposed on a driving part according to an embodiment.
Figure 22:
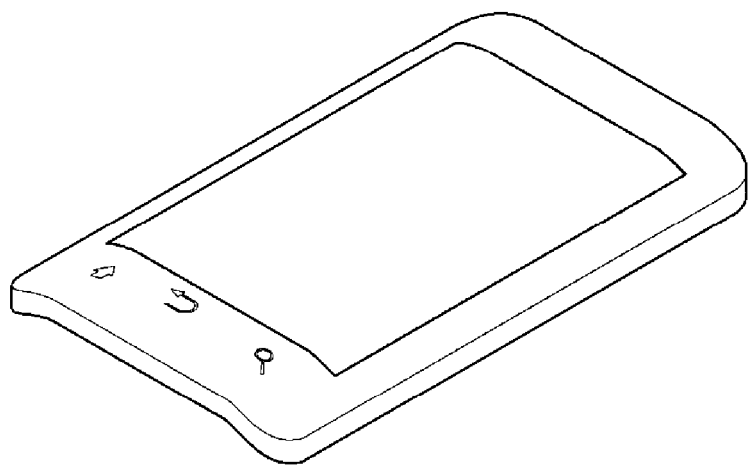
FIGS. 22 to 25 are perspective views showing a touch device according to another embodiment.
Figure 23:
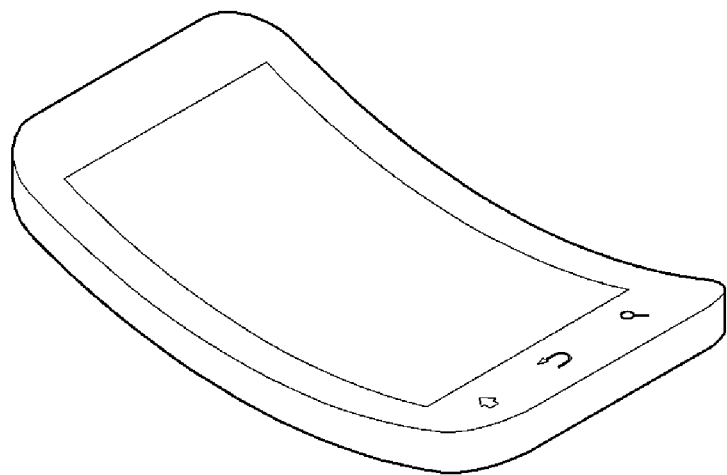
Figure 24:
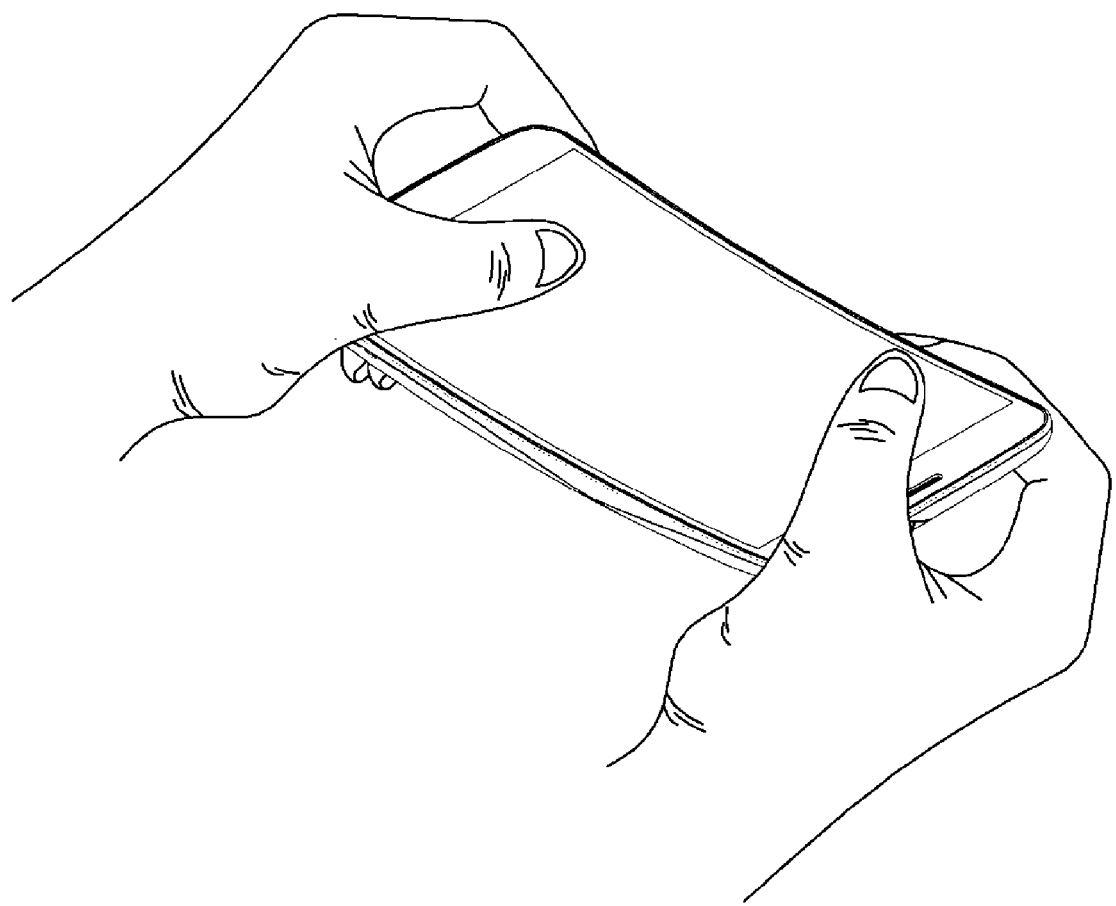
Figure 25:
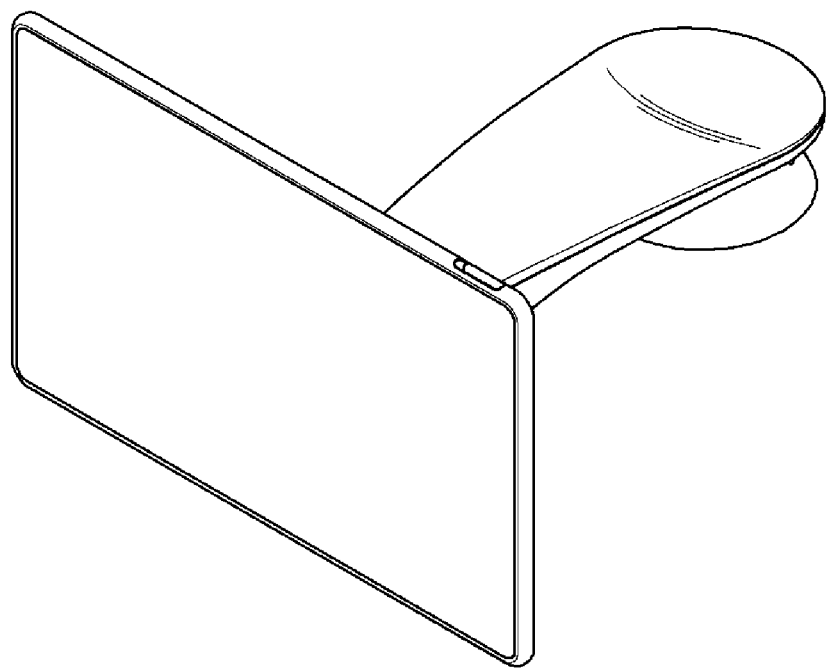

Referring to FIGS. 17 and 20, the first and second sensing electrodes 210 and 220 and the first and second wires may be disposed between the first and second substrates 701 and 702. That is, the first and second sensing electrodes 210 and 220 and the first and second wires may be disposed inside the display panel.

Figure 18:
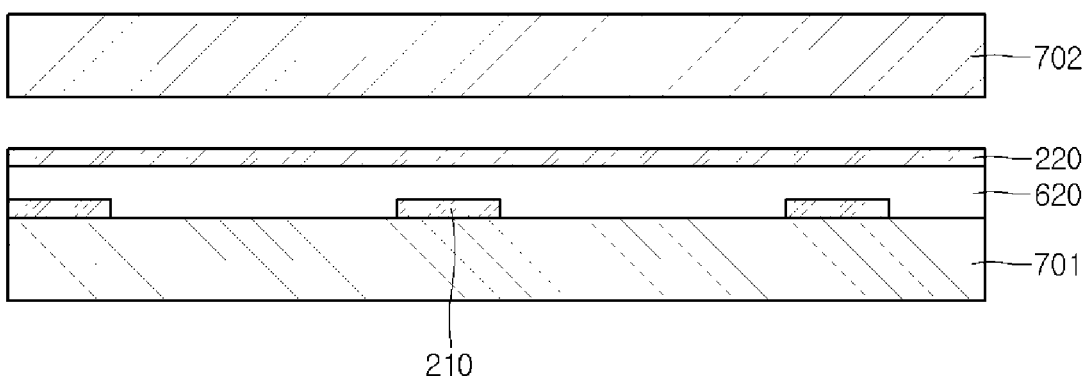

Referring to FIG. 17, the first sensing electrode 210 and the first wire may be formed on the top surface of the first substrate 710 of the display panel, and the second sensing electrode 220 and the second wire may be formed on a rear surface of the second substrate 702. Referring to FIG. 18, the first and second sensing electrodes 210 and 220 and the first and second wires may be formed on the top surface of the first substrate 701. An insulating layer may be formed between the first and second sensing electrodes 210 and 220. In addition, referring to FIG. 19, the first and second sensing electrodes 210 and 220 may be formed on the rear surface of the second substrate 702. An insulating layer 630 may be formed between the first and second sensing electrodes 210 and 220.

Referring to FIG. 20, the first sensing electrode 210 and the first wire may be formed between the first and second substrates 701 and 702. In addition, the second sensing electrode 220 and the second wire may be formed on the touch substrate 106. The touch substrate 106 may be disposed on the display panel including the first and second substrates 701 and 702. That is, the first sensing electrode 210 and the first wire may be disposed inside the display panel, and the second sensing electrode 220 and the second wire may be disposed outside the display panel.

The first sensing electrode 210 and the first wire may be formed on the top surface of the first substrate 701 or the rear surface of the second substrate 702. In addition, the adhesive layer may be formed between the touch substrate 106 and the display panel. In this case, the touch substrate 106 may serve as the cover substrate.

Although the configuration of forming the second sensing electrode 220 on the rear surface of the touch substrate 106 is depicted in the drawings, but the embodiment is not limited thereto. The second sensing electrode 220 may be formed on the top surface of the touch substrate 106, and the cover substrate may be further formed while being interposed between the touch substrate 106 and the adhesive layer.

That is, the embodiment is not limited to the drawings, and it is sufficient if the embodiment has a structure that the first sensing electrode 210 and the first wire are disposed inside the display panel and the second electrode 220 and the second wire are disposed outside the display panel.

In addition, the touch substrate 106 may be a polarizing plate. That is, the second sensing electrode 220 may be formed on the top or rear surface of the polarizing plate. Thus, the second sensing electrode may be formed integrally with the polarizing plate.

In addition, the polarizing plate may be further provided without regard to the touch substrate 106. In this case, the polarizing plate may be disposed below the touch substrate 106. For example, the polarizing plate may be interposed between the touch substrate 106 and the display panel. In addition, the polarizing plate may be disposed on the touch substrate 106.

When the display panel is a liquid crystal display panel and the sensing electrode is formed on the top surface of the first substrate 701, the sensing electrode may be formed together with a thin film transistor (TFT) and a pixel electrode. In addition, when the sensing electrode is formed on the rear surface of the second substrate 702, a color filter layer may be formed on the sensing electrode or the sensing electrode may be formed on the color filter layer. When the display panel is an organic light emitting device and the sensing electrode is formed on the top surface of the first substrate 701, the sensing electrode may be formed together with a thin film transistor or an organic light emitting device.

Meanwhile, referring to FIG. 15, the touch window 10 may be disposed on a display panel 20 serving as a driver. The touch window 10 may be combined with the display panel 20, so that a touch device may be implemented.

A display region to output an image is formed in the display panel 20. A display panel applied to the touch device may generally include an upper substrate 21 and a lower substrate 22. A data line, a gate line and a thin-film transistor (TFT) may be formed in the lower substrate 22. The upper substrate 21 may be adhesive to the lower substrate 22 such that the elements provided on the lower substrate 22 may be protected.

The display panel 20 may be formed in various types according to the type of touch device. That is, the touch device according to the embodiment may include a liquid-crystal device (LCD), a field emission display, a plasma display panel (PDP), an organic light-emitting diode (OLED), and an electronic paper display (EPD). Thus, the display panel 20 may be implemented in various types.

As shown in FIG. 16, such a touch device may be a mobile terminal. Specifically, the touch window may include a curved touch window. Therefore, a touch device including it may be a curved display device. Specifically, the touch device may be a touch device of which only an edge may be bent.

Meanwhile, referring to FIG. 17, the touch device may include a curved display device and may have an entirely bent shape.

Meanwhile, referring to FIG. 18, the touch window may include a flexible touch window. Thus, the display device including it may be a flexible touch device. Therefore, a user may flex or bend the display device with his hand.

Figure 19:
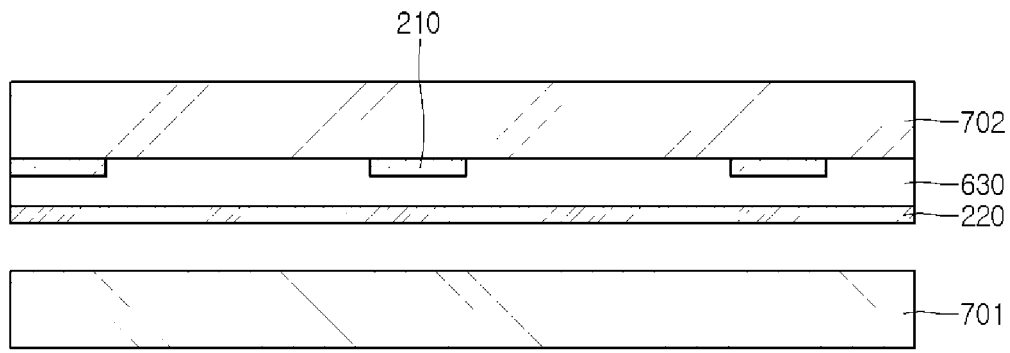

Meanwhile, referring to FIG. 19, the touch window may be applied to a vehicle navigation system as well as a mobile terminal. Although the vehicle navigation system is depicted in the drawings, the embodiment is not limited thereto. Accordingly, the touch window is applied to a dashboard as well as a PND (Personal Navigation Display) so that a CID (Center Information Display) may be implemented. However, the embodiment is not limited to the embodiment. In other words, the display may be used in various electronic products.

The embodiment is to provide a touch window of which reliability is improved, and a touch device including the same.

A touch window according to an embodiment includes a substrate; a sensing electrode disposed on the substrate to sense a position; and a protective layer on the sensing electrode.

A touch device according to an embodiment includes a touch window; and a driving part on the touch window, wherein the touch window includes: a substrate; a sensing electrode disposed on the substrate to sense a position; and a protective layer on the sensing electrode.

According to the touch window of the embodiment, when the substrate is bent or flexed, the protective layer may protect the sensing electrode from a physical shock. That is, the protective layer may reinforce the sensing electrode so that the reliability may be improved.

In addition, the protective layer is index-matched with the sensing electrode by adjusting the refractive index to the sensing electrode, so that the optical property and visibility may be improved.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A capacitive touch sensor comprising:
   a substrate including a first active area and a second active area extended from the first active area;
   a sensing electrode provided on the substrate to sense a position; and
   a protective layer on the sensing electrode,
   wherein the first active area and the second active area each detect a position of an input device,
   wherein the first active area is flat,
   wherein the second active area is bent from the first active area,
   wherein the sensing electrode includes a plurality of sensing electrodes;
   wherein the protective layer includes a first protective layer and a second protective layer;
   wherein the first protective layer is provided on a top surface of the sensing electrode,
   wherein the second protective layer is between a top surface of the substrate and a bottom surface of the sensing electrode,
   wherein a thickness of the first protective layer is larger than a thickness of the sensing electrode, and
   wherein at least one of the first protective layer and the second protective layer is index-matched with the sensing electrode by adjusting a refractive index.

2. The capacitive touch sensor of claim 1, wherein the first protective layer is provided between the plurality of sensing electrodes, and
   wherein the first protective layer is in direct contact with the plurality of sensing electrodes.

3. The capacitive touch sensor of claim 2, wherein the first protective layer is in direct contact with the second protective layer between the plurality of sensing electrodes.

4. The capacitive touch sensor of claim 1, wherein the sensing electrode includes
   a first sensing electrode on the first active area; and
   a second sensing electrode on the second active area,
   wherein the first sensing electrode includes indium tin oxide, indium zinc oxide, copper oxide, tin oxide, zinc oxide or titanium oxide, and
   wherein the second sensing electrode includes a nanowire, a carbon nanotube (CNT), grapheme or conductive polymer.

5. The capacitive touch sensor of claim 1, wherein the protective layer includes polymer.

6. The capacitive touch sensor of claim 1, wherein the protective layer includes one selected from the group consisting of polyurethane, acrylate, methacrylate, epoxy, polycarbonate, polyethylene and polystyrene.

7. The capacitive touch sensor of claim 1, wherein at least one of the first and second protective layers have a thickness in a range of 1 μm to 20 μm.

8. The capacitive touch sensor of claim 1, wherein the substrate is flexible.

9. The capacitive touch sensor of claim 1, wherein the plurality of sensing electrodes includes
   one sensing electrode that extends in a first direction and another sensing electrode that extends in a second direction crossing the first direction.

10. The capacitive touch sensor of claim 1, wherein the first and second protective layers are in direct physical contact with at least one of the plurality of sensing electrodes.

11. The capacitive touch sensor of claim 1, wherein the first protective layer includes a plurality of protective parts, wherein the plurality of protective parts are spaced apart from each other.

12. The capacitive touch sensor of claim 11, wherein the first protective layer is divided into the plurality of protective parts such that a first protective part is laterally spaced apart from a second protective part and provided near opposite sides of the first active area.

13. The capacitive touch sensor of claim 11, wherein the plurality of protective parts include a first protective part and a second protective part,
    wherein at least one of the plurality of sensing electrodes is disposed between the first protective part and the second protective part.

14. The capacitive touch sensor of claim 13, wherein the first protective part and the second protective part are disposed between the first active area and the second active area.

15. The capacitive touch sensor of claim 11, wherein two adjacent sensing electrodes have respective side surfaces that face each other, and at least one of the plurality of protective parts covers the side surfaces of the two adjacent sensing electrodes.

16. The capacitive touch sensor of claim 1, wherein the first protective layer covers at least one of a top surface or a side surface of at least one of the plurality of sensing electrodes.

17. The capacitive touch sensor of claim 1, further comprising a cover substrate on the substrate, wherein the cover substrate has a prescribed shape corresponding to a shape of the substrate.

18. The capacitive touch sensor of claim 17, wherein the second active area is bent from the first active area in a direction from a front side to a rear side of the substrate, and
    wherein the sensing electrode protrudes perpendicular to a front surface of the substrate.

19. The capacitive touch sensor of claim 1, wherein the first protective layer is thicker than the second protective layer.

20. The capacitive touch sensor of claim 1, wherein the first protective layer is in direct contact with the second protective layer at an area between two adjacent sensing electrodes.

21. The capacitive touch sensor of claim 1, further comprising a resin layer on the substrate, wherein
    the resin layer includes an intaglio portion, and
    the sensing electrode is disposed in the intaglio portion.

22. A display device comprising;
a display panel;
a capacitive touch sensor disposed on the display panel; and
a cover substrate on the capacitive touch sensor,
wherein the display panel includes a lower substrate,
wherein a thin film transistor (TFT) is disposed on the lower substrate,
wherein the capacitive touch sensor includes:
   a substrate including a first active area and a second active area extended from the first active area,
   a sensing electrode provided on the substrate to sense a position, and
   a protective layer on the sensing electrode,
wherein the first active area and the second active area each detect a position of device touch input,
wherein the first active area is flat,
wherein the second active area is bent from the first active area,
wherein the cover substrate has a prescribed shape corresponding to a shape of the first active area and the second active area,
wherein the sensing electrode includes a plurality of sensing electrodes,
wherein the protective layer includes a first protective layer and a second protective layer,
wherein the first protective layer is provided on a top surface of the sensing electrode,
wherein the second protective layer is between a top surface of the substrate and a bottom surface of the sensing electrode,
wherein a thickness of the first protective layer is larger than a thickness of the sensing electrode, and
wherein at least one of the first protective layer and the second protective layer is index-matched with the sensing electrode by adjusting a refractive index.

23. The display device of claim 22, wherein the display panel includes at least one of LCD, FED, PDP, OLED or EPD.

* * * * *